(12) United States Patent
Hama

(10) Patent No.: US 8,664,301 B2
(45) Date of Patent: Mar. 4, 2014

(54) METHOD FOR PRODUCING A THERMOPLASTIC POLYMER MATERIAL

(75) Inventor: Hisakatsu Hama, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 262 days.

(21) Appl. No.: 13/070,053

(22) Filed: Mar. 23, 2011

(65) Prior Publication Data

US 2011/0245382 A1 Oct. 6, 2011

(30) Foreign Application Priority Data

Mar. 31, 2010 (JP) .................................. 2010-081674
Oct. 1, 2010 (JP) .................................. 2010-223587

(51) Int. Cl.
*C08K 5/15* (2006.01)
*C08K 5/05* (2006.01)

(52) U.S. Cl.
USPC .................. 524/56; 524/27; 524/58; 524/387

(58) Field of Classification Search
USPC ................. 524/56, 387, 58, 27, 383; 525/240
See application file for complete search history.

(56) References Cited

U.S. PATENT DOCUMENTS

| | | | | |
|---|---|---|---|---|
| 3,256,219 A | * | 6/1966 | Will | .................. 521/62 |
| 3,961,009 A | * | 6/1976 | Yoda et al. | .................. 264/205 |
| 4,110,844 A | * | 8/1978 | Nakamura | .................. 366/83 |
| 4,752,429 A | * | 6/1988 | Grosbard | .................. 264/141 |
| 6,495,612 B1 | | 12/2002 | Corzani et al. | |
| 7,868,069 B2 | | 1/2011 | Ito | |

FOREIGN PATENT DOCUMENTS

| | | |
|---|---|---|
| JP | 63-284203 A | 11/1988 |
| JP | 2000-239454 A | 9/2000 |
| JP | 2006-225444 A | 8/2006 |
| JP | 2006-328245 A | 12/2006 |

* cited by examiner

*Primary Examiner* — Hannah Pak
(74) *Attorney, Agent, or Firm* — Sughrue Mion, PLLC

(57) ABSTRACT

A method for producing a thermoplastic polymer material is provided, the method including the steps of supplying component (A) below to a vent type extruder that includes a starting material supply opening, a liquid inlet, and a vent via the starting material supply opening of the extruder, supplying component (B) below to the extruder via the liquid inlet of the extruder, melting and kneading component (A) and component (B) within the extruder, and degassing a volatile component via the vent and extruding through a die a thermoplastic polymer material comprising a thermoplastic polymer of component (A) and at least one compound selected from compound group S of component (B).

(A) A polymer composition that includes a thermoplastic polymer and an organic solvent and/or a monomer.

(B) A solution of at least one compound selected from compound group S consisting of trehalose, sucrose, lactose, maltose, etc.

7 Claims, 1 Drawing Sheet

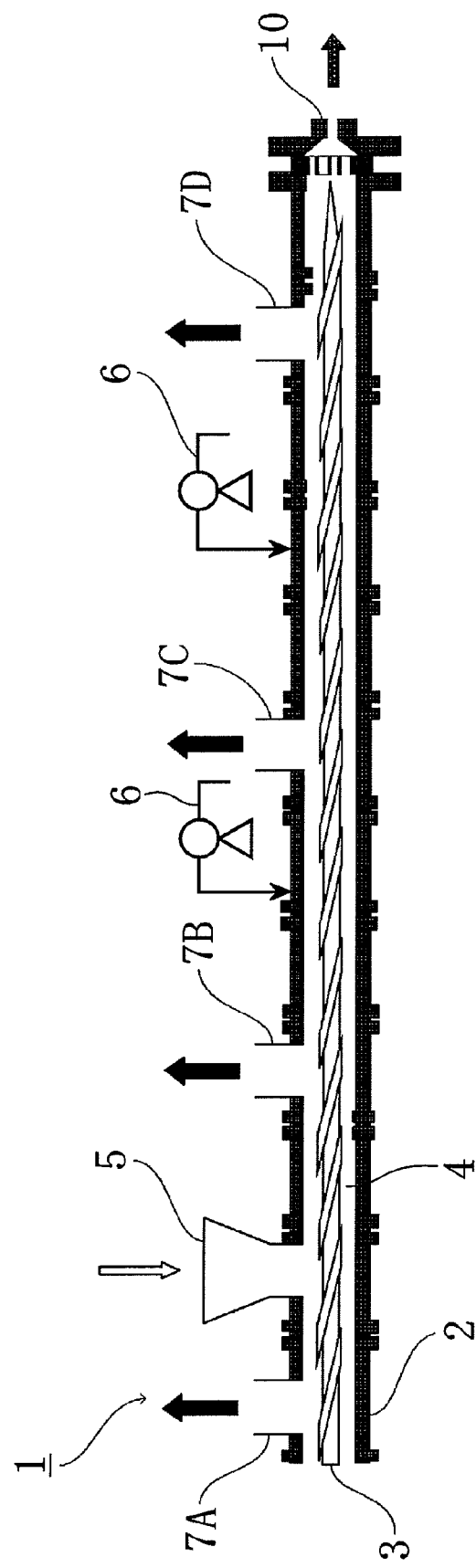

METHOD FOR PRODUCING A THERMOPLASTIC POLYMER MATERIAL

BACKGROUND OF THE INVENTION

1. Field of the Invention

The present invention relates to a method for producing a thermoplastic polymer material.

2. Description of Related Art

As a method for obtaining a thermoplastic polymer material by removing solvent and unreacted monomer from a thermoplastic polymer solution obtained by solution-polymerization, etc., a method in which a polymer solution is concentrated by a flash evaporation method and subjected to steam stripping and a method in which a polymer solution is added dropwise to a large amount of a poor solvent to prepare a liquid in which precipitated polymer particles are dispersed and this liquid is filtered are known. These methods require the use of a very large amount of steam or poor solvent. Because of this, as a method in which the amount of steam or poor solvent used is reduced or eliminated, a method in which, using a vent type extruder, a thermoplastic polymer solution is kneaded at high shear and volatile components such as solvent are removed by suction via a vent has been examined (ref. JP-A-63-284203 29802 (JP-A denotes a Japanese unexamined patent application publication)).

SUMMARY OF THE INVENTION

However, in the conventional method employing a vent type extruder, if the rotational speed of a screw of the extruder is increased to increase the amount extruded in order to increase production speed or if the polymer temperature within the extruder is increased in order to improve the efficiency with which volatile components are removed by suction, there is a possibility of the mechanical properties of the thermoplastic polymer material being degraded, and the method is not fully satisfactory.

Under such circumstances, it is an object of the present invention to provide a method for producing a thermoplastic polymer material having a small amount of volatile component by removing volatile components such as solvent and monomer from a thermoplastic polymer containing solvent and/or monomer by means of a vent type extruder, wherein the mechanical properties of the thermoplastic polymer material are maintained even when the rotational speed of a screw of the extruder is increased or the polymer temperature within the extruder is increased.

The present invention is directed to a method for producing a thermoplastic polymer material, the method comprising the steps of:

supplying component (A) below to a vent type extruder comprising a starting material supply opening, a liquid inlet, and a vent via the starting material supply opening of the vent type extruder;

supplying component (B) below to the vent type extruder via the liquid inlet of the vent type extruder;

melting and kneading component (A) and component (B) within the vent type extruder; and degassing a volatile component via the vent and extruding through a die a thermoplastic polymer material comprising a thermoplastic polymer of component (A) and at least one compound selected from compound group S of component (B)

(A) a polymer composition comprising a thermoplastic polymer and an organic solvent and/or a monomer (B) a solution of at least one compound selected from compound group S below compound group S: a compound group consisting of a compound represented by the formula $C_nH_{n+2}(OH)_n$ (wherein n denotes an integer of not less than 4), the alkoxylated material below, a compound represented by formula (2) below, trehalose, sucrose, lactose, maltose, melezitose, stachyose, curdlan, glycogen, glucose, and fructose alkoxylated material: a compound in which at least one hydroxy group of a compound represented by formula (1) below is alkoxylated with an alkyl group having 1 to 12 carbon atoms, the compound represented by formula (1) being a compound comprising in the molecule one aldehyde or ketone group and m−1 hydroxy groups $$C_mH_{2m}O_m \qquad (1)$$

wherein m denotes an integer of not less than 3

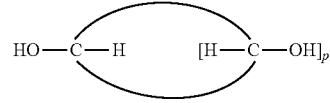

(2)

wherein p denotes an integer of not less than 2.

BRIEF DESCRIPTION OF DRAWINGS

FIG. 1 is a schematic sectional view of one example of a vent type extruder used in the present invention.

EXPLANATION OF REFERENCE NUMERALS AND SYMBOLS

1: extruder
2: cylinder
3: screw
4: kneading section
5: starting material supply opening
6: liquid inlet
7A, 7B, 7C, 7D: vents
10: die

DETAILED DESCRIPTION OF THE INVENTION

The production method of the present invention is explained below by reference to FIG. 1.

The method for producing a thermoplastic polymer material of the present invention is carried out using a vent type extruder 1 illustrated in FIG. 1. The vent type extruder 1 includes a kneading section 4 in which a screw 3 extends through the interior of a cylinder 2. This vent type extruder 1 includes a starting material supply opening 5 for supplying a starting material from the outside to the interior of the cylinder and a liquid inlet 6 for introducing a liquid under pressure, and includes a plurality of vents 7A, 7B, 7C, and 7D for releasing volatile components within the cylinder to the outside. Component (A) a polymer composition containing a thermoplastic polymer and an organic solvent and/or a monomer supplied via the starting material supply opening 5 is melted and kneaded in the kneading section 4 with component (B) a solution of at least one compound selected from compound group S below injected via the liquid inlet 6, and the organic solvent and/or the monomer in component (A)

and the solvent in component (B) are released outside the cylinder via the vents 7A, 7B, 7C, and 7D. The thermoplastic polymer material is extruded through a die 10 present at the end of the cylinder 2.

The vent type extruder illustrated in FIG. 1 may be a single screw extruder or a twin screw extruder, or may be a conical type extruder and a single screw extruder and/or a parallel multi-screw extruder.

The starting material supply opening 5 may include a screw for kneading component (A) supplied into a hopper and supplying it to the interior of the extruder.

The liquid inlet 6 may include a pump for supplying a component (B) liquid.

An example of the constitution of the vent type extruder used in the present invention is a twin screw extruder having four vents from the upstream side of the extruder toward the downstream side in the order first vent, second vent, third vent, and fourth vent, a starting material supply opening between the first vent and the second vent, a first liquid inlet between the second vent and the third vent, and a second liquid inlet between the third vent and the fourth vent.

Component (A) is a polymer composition containing a thermoplastic polymer and an organic solvent and/or a monomer.

Examples of the thermoplastic polymer include an ethylene polymer, a propylene polymer, a diene polymer, and a styrene polymer.

Examples of the ethylene polymer include an ethylene homopolymer such as high-density polyethylene (HDPE) or low-density polyethylene (LDPE), an ethylene-1-butene copolymer, an ethylene-1-hexene copolymer, an ethylene-1-octene copolymer, an ethylene-propylene-1-butene copolymer, an ethylene-1-butene-1-hexene copolymer, an ethylene-vinyl acetate copolymer, an ethylene-ethyl acrylate copolymer, an ethylene-methyl methacrylate copolymer, chlorinated polyethylene, and an ethylene-vinyl alcohol copolymer.

Examples of the propylene polymer include a propylene homopolymer, a propylene-ethylene copolymer, a propylene-1-butene copolymer, a propylene-1-hexene copolymer, a propylene-1-octene copolymer, a propylene-ethylene-1-butene copolymer, a propylene-ethylene-1-hexene copolymer, a propylene-ethylene-1-octene copolymer, and a propylene-1-butene-1-hexene copolymer. They may be a random copolymer or a block copolymer.

Examples of the diene polymer include a 1,2-butadiene homopolymer, an isoprene homopolymer, a butadiene-styrene copolymer, a butadiene-acrylonitrile copolymer, an ethylene-propylene-5-ethylidene-2-norbornene copolymer, an ethylene-propylene-dicyclopentadiene copolymer, and an ethylene-propylene-5-vinyl-2-norbornene copolymer.

Examples of the styrene polymer include a styrene homopolymer, a p-methylstyrene homopolymer, an α-methylstyrene homopolymer, a styrene-acrylonitrile copolymer, a styrene-acrylonitrile-butadiene copolymer, an acrylic rubber-acrylonitrile-styrene copolymer, and an acrylonitrile-chlorinated polyethylene-styrene copolymer.

Examples of other thermoplastic polymers include poly-4-methylpentene; polychloroprene; polyvinylidene chloride; a methacrylic resin; a fluorine resin; polyacetal; polyphenylene ether; a graft polyphenylene ether resin grafted with styrene, phthalic anhydride, fumaric acid, etc.; polyphenylene sulfide; polyurethane; polyamide; a polyester such as polyethylene terephthalate or polybutylene terephthalate; an aromatic polyester; polycarbonate; polyacrylate; polysulfone; polyether ether ketone; polyether sulfone; and a silicone resin.

The thermoplastic polymer is preferably an ethylene polymer, a propylene polymer, a diene polymer, or a styrene polymer.

As the organic solvent, various types of compounds used in the production of a thermoplastic polymer may be used. Examples thereof include an aliphatic hydrocarbon such as propane, butane, isobutane, pentane, hexane, heptane, or octane; and an alicyclic hydrocarbon such as cyclopentane or cyclohexane. At least one type thereof may be used. An aliphatic hydrocarbon having 5 to 8 carbon atoms is preferable.

The monomer is a compound used as a monomer in the production of a thermoplastic polymer. Examples thereof include ethylene, propylene, 1-butene, 1-hexene, 1-octene, vinyl acetate, ethyl acrylate, methyl methacrylate, 1,2-butadiene, isoprene, styrene, p-methylstyrene, α-methylstyrene, and acrylonitrile.

The total content of organic solvent and monomer in component (A) is, with the thermoplastic polymer as 100 parts by weight, preferably not more than 35 parts by weight, more preferably not more than 20 parts by weight, and yet more preferably not more than 12 parts by weight.

Component (A) may contain an additive. Examples of the additive include an antioxidant such as a phenol-based antioxidant, a hydroquinone-based antioxidant, a sulfur-based antioxidant, or a phosphorus-based antioxidant; a UV absorber; a light stabilizer; a metal deactivator; a nucleating agent; a lubricant; and an antistatic agent. As the antioxidant, at least one antioxidant selected from the antioxidant group consisting of a phenol-based antioxidant, a hydroquinone-based antioxidant, a sulfur-based antioxidant, and a phosphorus-based antioxidant is preferably used. Examples of each additive are described later.

When component (A) contains an antioxidant, the amount of antioxidant is preferably from 0.01 to 5 parts by weight per 100 parts by weight of the thermoplastic polymer.

Component (B) is a solution of at least one compound selected from compound group S.

Compound group S: a compound group consisting of a compound represented by the formula $C_nH_{n+2}(OH)_n$ (wherein n denotes an integer of not less than 4), the alkoxylated material below, a compound represented by formula (2) below, trehalose, sucrose, lactose, maltose, melezitose, stachyose, curdlan, glycogen, glucose, and fructose.

Alkoxylated material: a compound in which at least one hydroxy group of a compound represented by formula (1) below is alkoxylated with an alkyl group having 1 to 12 carbon atoms, said compound represented by formula (1) being a compound containing in the molecule one aldehyde or ketone group and m−1 hydroxy groups.

$$C_mH_{2m}O_m \quad (1)$$

wherein m denotes an integer of not less than 3.

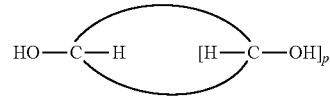

(2)

wherein p denotes an integer of not less than 2.

n in the formula for a compound represented by the formula $C_nH_{n+2}(OH)_n$ (hereinafter, referred to as compound S1) denotes an integer of not less than 4. n is preferably an integer of from 5 to 8, and more preferably 6.

Examples of compound S1 include sugar alcohols having not less than 4 carbon atoms. Examples of sugar alcohols with n=4 include erythritol and threitol; examples of sugar alcohols with n=5 include adonitol, arabinitol, and xylitol; examples of sugar alcohols with n=6 include allitol, talitol, sorbitol, mannitol, iditol, and galactitol; examples of sugar alcohols with n=7 include volemitol and perseitol; and examples of sugar alcohols with n=8 include octitol.

Compound S1 may be a D-isomer or an L-isomer or may be a mixture of a D-isomer and an L-isomer.

It may be optically active or optically inactive.

Compound S1 is preferably a sugar alcohol having 6 carbon atoms.

The alkoxylated material is a compound in which at least one hydroxy group of a compound represented by formula (1) below (hereinafter, also referred to as compound (1)) is alkoxylated with an alkyl group having 1 to 12 carbon atoms, compound (1) being a compound containing in the molecule one aldehyde or ketone group and m−1 hydroxy groups.

$$C_mH_{2m}O_m \quad (1)$$

wherein m in compound (1) is an integer of not less than 3, preferably from 3 to 60, and particularly preferably 6 or 12.

Compound (1) contains one aldehyde or ketone group in the molecule. Compound (1) also contains m−1 hydroxy groups.

Compound (1) is preferably a monosaccharide; specific examples thereof include an aldehyde group-containing monosaccharide such as glycerose, erythrose, threose, ribose, lyxose, xylose, arabinose, aldohexose, allose, talose, gulose, glucose, altrose, mannose, galactose, idose, or octose and a ketone group-containing monosaccharide such as ketotriose, dihydroxyacetone, ketotetrose, erythrulose, ketopentose, xylulose, ribulose, ketohexose, psicose, fructose, sorbose, or tagatose.

Compound (1) may be an optically active compound such as a D-isomer or an L-isomer or may be an optically inactive compound such as a DL-isomer.

Among them, compound (1) is preferably a hexose such as allose, talose, gulose, glucose, altrose, mannose, galactose, idose, psicose, fructose, sorbose, or tagatose, and glucose is particularly preferable.

The alkoxylated material is a compound in which at least one hydroxy group contained in compound (1) is alkoxylated with an alkyl group. The alkoxylated material is preferably one containing at least one hydroxy group. An alkoxylated material in which one of the hydroxy groups contained in compound (1) is alkoxylated and the other groups remain hydroxy groups is particularly preferable.

The number of carbon atoms of the alkyl group is from 1 to 12, preferably 1 or 2, and particularly preferably 1.

Preferred examples of the alkoxylated material include compounds represented by formula (1-2).

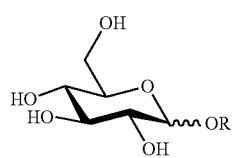

(1-2)

wherein R denotes an alkyl group having 1 to 12 carbon atoms and preferably from 5 to 12 carbon atoms.

Examples of compounds represented by formula (1-2) include methyl α-D-glucopyranoside, methyl β-D-glucopyranoside, ethyl α-D-glucopyranoside, ethyl β-D-glucopyranoside, n-propyl α-D-glucopyranoside, n-propyl β-D-glucopyranoside, n-butyl α-D-glucopyranoside, n-butyl β-D-glucopyranoside, n-pentyl α-D-glucopyranoside, n-pentyl β-D-glucopyranoside, n-hexyl α-D-glucopyranoside, n-hexyl β-D-glucopyranoside, n-heptyl α-D-glucopyranoside, n-heptyl β-D-glucopyranoside, n-octyl α-D-glucopyranoside, n-octyl β-D-glucopyranoside, n-nonyl α-D-glucopyranoside, n-nonyl β-D-glucopyranoside, n-decyl α-D-glucopyranoside, n-decyl β-α-glucopyranoside, n-undecyl α-D-glucopyranoside, n-undecyl β-D-glucopyranoside, n-dodecyl α-D-glucopyranoside, and n-dodecyl β-D-glucopyranoside.

As a method for producing the alkoxylated material, for example, as described in Shin Jikken Kagaku Koza (New Experimental Chemistry Series) 14 Organic Compound Synthesis and Reactions V (Maruzen, published 20 Jul. 1978) p. 2426, a method in which hydrogen chloride gas is passed through an alkyl alcohol solution of compound (1) at −10° C. to room temperature, a method in which a mixed solution of compound (1), an alkyl alcohol, and hydrochloric acid is alkoxylated by heating and refluxing, etc. can be cited.

Furthermore, methyl α-D-glucopyranoside, n-octyl β-D-glucopyranoside, etc. are available from Tokyo Chemical Industry Co., Ltd.

With regard to a compound represented by formula (2) below (hereinafter, also referred to as compound (2)), in formula (2), p denotes an integer of not less than 2, preferably from 0.2 to 6, and particularly preferably 5.

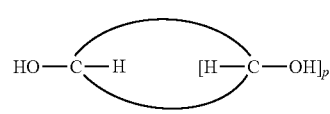

(2)

Examples of compound (2) include 1,2,3-trihydroxycyclopropane, 1,2,3,4-tetrahydroxycyclopentane, 1,2,3,4,5-pentahydroxycyclopentane, 1,2,3,4,5,6-hexahydroxycyclohexane, 1,2,3,4,5,6,7-heptahydroxycycloheptane, and 1,2,3,4,5,6,7,8-octahydroxycyclooctane.

Preferred examples include 1,2,3,4,5,6-hexahydroxycyclohexanes such as myo-inositol, epi-inositol, allo-inositol, muco-inositol, neo-inositol, chiro-inositol, and scyllo-inositol; myo-inositol and scyllo-inositol, which are represented by the formulae below, are particularly preferable.

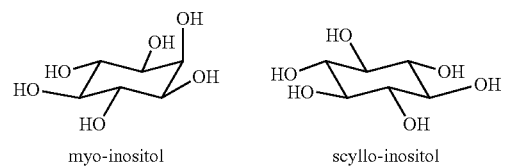 [SMILES: OC1C(O)C(O)C(O)C(O)C1O ; OC1C(O)C(O)C(O)C(O)C1O]

myo-inositol          scyllo-inositol

In order to further suppress thermal degradation (in order to further maintain mechanical properties) the concentration of compound group S in component (B) is preferably from 0.01% to 60% by weight, more preferably from 0.5% to 40% by weight, and yet more preferably from 1% to 20% by weight. Here, component (B) is 100% by weight.

As the solvent of component (B), water is usually used.

In the method of the present invention, component (A) and component (B) are supplied to a vent type extruder via a starting material supply opening and a liquid inlet respectively, component (A) and component (B) are melted and kneaded in the vent type extruder, volatile components in the melt-kneaded material are degassed from a vent, and a thermoplastic polymer material containing a thermoplastic polymer of component (A) and at least one compound selected from compound group S of component (B) is extruded through a die.

Any vent type extruder may be used as long as it includes a starting material supply opening for supplying component (A) to the interior of the extruder, a liquid inlet for component (B) for supplying component (B) to the interior of the extruder, and a vent for degassing volatile components such as an organic solvent, a monomer, and a solvent of component (B), and a known extruder may be used. The extruder may be a vent type single stage extruder or may be a vent type multi-stage extruder. It may have a plurality of liquid inlets and may have a liquid inlet other than one for component (B). A liquid inlet may be present on the downstream side of a vent on the most downstream side, or a vent may be present on the upstream side of a liquid inlet on the most upstream side. The extruder may be a single screw extruder or a twin screw extruder.

The position of the vent type extruder liquid inlet for supplying component (B) is preferably on the downstream side relative to the position where component (A) is supplied. Component (B) may be supplied from a plurality of positions.

The position of the vent type extruder liquid inlet for supplying component (B) is preferably in a zone in the extruder in which the total content of the organic solvent and the monomer in the thermoplastic polymer composition is not more than 10 parts by weight (provided that the thermoplastic polymer is 100 parts by weight), and is more preferably in a zone in the extruder in which the total content of the organic solvent and the monomer in the thermoplastic polymer composition is not more than 5 parts by weight.

The position of the vent type extruder liquid inlet for supplying component (B) is preferably in a zone in the extruder in which the temperature of the thermoplastic polymer is from 120° C. to 250° C. The temperature of the thermoplastic polymer in the zone is more preferably not more than 200° C. The temperature of the thermoplastic polymer in the zone is more preferably not less than 150° C.

With regard to the amount of component (B) supplied, as the amount of compound group S per 100 parts by weight of the thermoplastic polymer, in order to further suppress thermal degradation (in order to further maintain mechanical properties) it is preferably not less than 0.001 parts by weight, more preferably not less than 0.01 parts by weight, and yet more preferably not less than 0.02 parts by weight. The amount supplied is, as the amount of compound group S per 100 parts by weight of the thermoplastic polymer, preferably not more than 5 parts by weight, more preferably not more than 2 parts by weight, and yet more preferably not more than 1 part by weight.

The amount of component (B) supplied to the extruder is, per 100 parts by weight of thermoplastic polymer, preferably from 0.1 to 10 parts by weight, and more preferably from 0.5 to 5 parts by weight.

In the vent, volatile components such as organic solvent, monomer, and solvent of component (B) are degassed by reducing the pressure using a vacuum pump, etc. The vent pressure is usually from 5 to 100 kPa-A, and preferably from 10 to 80 kPa-A. When there are a plurality of vents, it is preferable in terms of degassing efficiency that the degree of pressure reduction is set so that it increases in going toward the downstream side of the extruder.

The temperature of the thermoplastic polymer material extruded through the die is preferably from 150° C. to 300° C.

An additive, water, oil, etc. may be supplied via the starting material supply opening of the vent type extruder, or a supply opening other than one for component (B) is provided in the extruder and an additive, water, oil, etc. may be supplied to the interior of the extruder via the supply opening.

Examples of the above-described additives include an antioxidant, ultraviolet absorber, photostabilizer, metal deactivator, nucleating agent, lubricant, antistatic agent, flame retardant, filler, pigment.

Examples of the antioxidant include an phenol type antioxidant, hydroquinone antioxidant, sulfur-based antioxidant, and phosphorus-based antioxidant.

Examples of the phenol type antioxidant as one example of the antioxidant include alkylated monophenols such as pentaerythritoltetrakis[3-(3,5-di-t-buthyl-4-hydroxyphenyl) propionate], n-octadecyl-β-(4'-hydroxy-3'5'-di-t-buthylphenyl)propionate, 3,9-bis[1,1-dimethyl-2-[β-(3-t-buthyl-4-hydroxy-5-methylphenyl)propionyloxy]ethyl]2,4,8,10-tetraoxaspiro[5,5]-undecane, 2-[1-(2-hydroxy-3,5-di-t-pentylphenyl)ethyl]-4,6-di-t-penthylphenylacrylate, 2-t-buthyl-6-(3-t-buthyl-2-hydroxy-5-methylbenzyl)-4-methylphenylacrylate, 2,6-di-t-butyl-4-methylphenol, 2,4,6-tri-t-butylphenol, 2,6-di-t-butylphenol, 2-t-butyl-4,6-dimethylphenol, 2,6-di-t-butyl-4-ethylphenol, 2,6-di-t-butyl-4-n-butylphenol, 2,6-di-t-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-t-butyl-4-methoxymethylphenol, 2,6-di-nonyl-4-methylphenol, 2,4-dimethyl-6-(1'-methylundecyl-1'-yl)phenol, 2,4-dimethyl-6-(1'-methylheptadecyl-1'-yl)phenol, 2,4-dimethyl-6-(1'-methyltridecyl-1'-yl)phenol and mixtures thereof, and the like, alkylthiomethylphenols such as 2,4-dioctylthiomethyl-6-t-butylphenol, 2,4-dioctylthiomethyl-6-methylphenol, 2,4-dioctylthiomethyl-6-ethylphenol, 2,6-didodecyl-thiomethyl-4-nonylphenol and mixtures thereof, and the like, alkylidenebisphenol and derivatives thereof such as 2,2'-methylenebis(4-methyl-6-t-butylphenol), 2,2'-methylenebis (4-ethyl-6-t-butylphenol), 2,2'-methylenebis[4-methyl-6-(α-methylcyclohexyl)phenol], 2,2'-methylenebis(4-methyl-6-cyclohexylphenol), 2,2'-methylenebis(4-methyl-6-nonylphenol), 2,2'-methylenebis(4,6-di-t-butylphenol), 2,2'-ethylidenebis(4,6-di-t-butylphenol), 2,2'-ethylidenebis(4-isobutyl-6-t-butylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(6-t-butyl-2-methylphenol), 4,4'-methylenebis(2,6-di-t-butylphenol), 4,4'-butylidenebis(3-methyl-6-t-butylphenol), 1,1-bis(4-hydroxyphenyl) cyclohexane, 1,1-bis(5-t-butyl-4-hydroxy-2-methylphenyl)butane, 2,6-bis(3-t-butyl-5-methyl-2-hydroxybenzyl)-4-methylphenol, 1,1,3-tris(5-t-butyl-4-hydroxy-2-methylphenyl)butane, 1,1-bis(5-t-butyl-4-hydroxy-2-methylphenyl)-3-n-dodecyl-mercaptobutane, ethylene glycol bis[3,3-bis-3'-t-butyl-4'-hydroxyphenyl] butyrate, bis(3-t-butyl-4-hydroxy-5-methylphenyl)dicyclopentadiene, bis[2-(3'-t-butyl-2'-hydroxy-5'-methylbenzyl)-6-t-butyl-4-methylphenyl]terephthalate, 1,1-bis(3,5-dimethyl-2-hydroxyphenyl)butane, 2,2-bis(3,5-di-t-butyl-4-hydroxyphenyl)propane, 2,2-bis(5-t-butyl-4-hydroxy-2-methylphenyl)-4-n-dodecyl-mercaptobutane, 1,1,5,5-tetra(5-t-butyl-4-hydroxy-2-methylphenyl)pentane and mixtures thereof, acylaminophenol derivatives such as 4-hydroxylauric anilide, 4-hydroxystearic anilide, octyl-N-(3,5-di-t-butyl-4-hydroxyphenyl) carbanate and mixtures thereof, acylaminophenol derivatives such as 4-hydroxylauric anilide, 4-hydroxystearic anilide, octyl-N-(3,5-di-t-butyl-4-hydroxyphenyl) carbanate and mixtures thereof, an ester formed from β-(3,5-di-t-butyl-4-hydroxyphenyl) propionic acid and at least one alcohol selected from the group consisting of methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, and 4-hydroxymethyl-1-phospha-2,6,7-trioxabicyclo[2,2,2]octane;

a hydroxylated thiodiphenyl ether such as 2,2'-thiobis(6-t-butylphenol), 2,2'-thiobis(4-methyl-6-t-butylphenol), 2,2'-thiobis(4-octylphenol), 4,4'-thiobis(2-methyl-6-t-butylphenol), or 4,4'-(2,6-dimethyl-4-hydroxyphenyl) disulfide;

a benzyl derivative (O-benzyl derivative, N-benzyl derivative, S-benzyl derivative) such as 3,5,3',5'-tetra-t-butyl-4,4'-dihydroxydibenzyl ether, octadecyl 4-hydroxy-3,5-dimethylbenzylmercaptoacetate, tris(3,5-di-t-butyl-4-hydroxybenzyl)amine, bis(4-t-butyl-3-hydroxy-2,6-dimethylbenzyl) dithioterephthalate, bis(3,5-di-t-butyl-4-hydroxybenzyl)sulfide, isooctyl 3,5-di-t-butyl-4-hydroxybenzylmercaptoacetate, or a mixture thereof;

triazine derivatives such as 2,4-bis(n-octylthio)-6-(4-hydroxy-3,5-di-t-butylanilino)-1,3,5-triazine, 2-n-octylthio-4,6-bis(4-hydroxy-3,5-di-t-butylanilino)-1,3,5-triazine, 2-n-octylthio-4,6-bis(4-hydroxy-3,5-di-t-butyl-phenoxy)-1,3,5-triazine, 2,4,6-tris(3,5-di-t-butyl-4-phenoxy)-1,3,5-triazine, tris(4-t-butyl-3-hydroxy-2,6-dimethylbenzyl)isocyanurate, tris(3,5-di-t-butyl-4-hydroxybenzyl) isocyanurate, 2,4,6-tris(3,5-di-t-butyl-4-hydroxyphenylethyl)-1,3,5-triazine, 2,4,6-tris(3,5-di-t-butyl-4-hydroxyphenylpropyl)-1,3,5-triazine, tris(3,5-dicyclohexyl-4-hydroxybenzyl)isocyanurate, tris[2-(3',5'-di-t-butyl-4'-hydroxycinnamoyloxy)ethyl] isocyanurate and mixtures thereof, hydroxybenzylated malonate derivatives such as dioctadecyl-2,2-bis(3,5-di-t-butyl-2-hydroxybenzyl)malonate, dioctadecyl-2-(3-t-butyl-4-hydroxy-5-methylbenzyl)malonate, didodecylmercaptoethyl-2,2-bis(3,5-di-t-butyl-4-hydroxybenzyl)malonate, bis[4-(1,1,3,3-tetramethylbutyl) phenyl]-2,2-bis(3,5-di-t-butyl-4-h ydroxybenzyl)malonate and mixtures thereof, and the like, aromatic hydroxybenzyl derivatives such as 1,3,5-trimethyl-2,4,6-tris(3,5-di-t-butyl-4-hydroxybenzyl)benzene, 1,4-bis(3,5-di-t-butyl-4-hydroxybenzyl)-2,3,5,6-tetramethylbenzene, 2,4,6-tris(3,5-t-butyl-4-hydroxybenzyl)phenol and mixtures thereof and the like, benzyl phosphonate derivatives such as dimethyl-3,5-di-t-butyl-4-hydroxybenzyl phosphonate, diethyl-3,5-di-t-butyl-4-hydroxybenzyl phosphonate, dioctadecyl-3,5-di-t-butyl-4-hydroxybenzyl phosphonate, dioctadecyl-5-t-butyl-4-hydroxy-3-methylbenzyl phosphonate, calcium salt of 3,5-di-t-butyl-4-hydroxybenzylphosphonic acid monoester and mixtures thereof, and the like, an ester formed from β-(5-t-butyl-4-hydroxy-3-methylphenyl)propionic acid and at least one alcohol selected from the group consisting of methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, and 4-hydroxymethyl-1-phospha-2,6,7-trioxabicyclo [2.2.2]octane;

esters of β-(3,5-dicyclohexyl-4-hydroxyphenyl)propionic acid with at least one of the alcohol among methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxy-methyl-1-phospha-2,6,7-trioxabicyclo[2.2.2]octane and mixtures thereof, and the like, esters of 3,5-di-t-butyl-4-hydroxyphenylacetic acid with at least one of the alcohol among methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxy-ethyl)isocyanurate, N,N'-bis(hydroxy-ethyl)oxamide, 3-thiaundecanol, 3-thiapentadecanol, trimethylhexanediol, trimethylolpropane, 4-hydroxy-methyl-1-phospha-2,6,7-trioxabicyclo [2.2.2]octane and mixtures thereof, and the like, amides of β-(3,5-di-t-butyl-4-hydroxyphenyl)propionic acid such as N,N'-bis[3-(3',5'-di-t-butyl-4'-hydroxyphenyl)propionyl]hydrazine, N,N'-bis[3-(3',5'-di-t-butyl-4'-hydroxyphenyl)propionyl]hexamethylenediamine, N,N'-bis[3-(3',5'-di-t-butyl-4'-hydroxyphenyl)propionyl] trimethylenediamine and mixtures thereof, and the like, Tocopherols such as α-tocopherol, β-tocopherol, γ-tocopherol, δ-tocopherol and mixtures thereof, and the like.

Examples of the hydroquinone antioxidant include hydroquinone, 2,6-di-t-butyl-4-methoxyphenol, 2,5-di-t-butyl-hydroquinone, 2,5-di-t-amyl-hydroquinone, 2,6-diphenyl-4-octadecyloxyphenol, 2,6-di-t-butyl-hydroquinone, 2,5-di-t-butyl-4-hydroxyanisole, 3,5-di-t-butyl-4-hydroxyphenyl stearate, bis(3,5-di-t-butyl-4-hydroxyphenyl)adipate and mixtures thereof, and the like.

Examples of the sulfur-based antioxidant include 2,4-bis (octylthiomethyl)-O-cresol, 4,6-bis(dodecylthiomethyl)-O-cresol, dilauryl 3,3'-thiodipropionate, tridecyl 3,3'-thiodipropionate, dimyristyl 3,3'-thiodipropionate, distearyl 3,3'-thiodipropionate, lauryl stearyl 3,3'-thiodipropionate, neopentanetetrayltetrakis(3-lauryl thiopropionate) and, pentaerythrityltetrakis(3-laurylpropionate).

Examples of the phosphorus-based antioxidant include triphenyl phosphite, tris(nonylphenyl)phosphite, tris(2,4-di-t-butylphenyl)phosphite, 6-[3-(3-t-buthyl-4-hydroxy-5-methylphenyl)propoxy]-2,4,6,8,10-tetra-t-buthyldibenzo[d.f][1.3.2]dioxaphosphepine, trilauryl phosphite, trioctadecyl phosphite, distearyl pentaerythritol diphosphite, diisodecyl pentaerythritol diphosphite, bis(2,4-di-t-butylphenyl)pentaerythritol diphosphite, bis(2,4-di-t-butyl-6-methylphenyl) pentaerythritol diphosphite, bis(2,6-di-t-butyl-4-methylphenyl)pentaerythritol diphosphite, bis(2,4,6-tri-t-butylphenyl) pentaerythritol diphosphite, tristearylsorbitol triphosphite, tetrakis(2,4-di-t-butyl-phenyl)-4,4'-diphenylene diphosphonite, 2,2'-methylenebis(4,6-di-t-butylphenyl)-2-ethylhexyl phosphite, 2,2'-ethylidenebis(4,6-di-t-butyl-phenyl)fluorophosphite, bis(2,4-di-t-butyl-6-methyl phenyl)ethylphosphite, bis(2,4-di-t-butyl-6-methylphenyl)methylphosphite, 2-(2,4,6-tri-t-butyl-phenyl)-5-ethyl-5-butyl-1,3,2-oxaphosphorinane, 2,2',2"-nitrilo[triethyltris(3,3',5,5'-tetra-t-butyl-1,1'-biphenyl-2,2'-diyl)phosphite and mixtures thereof, and the like.

Examples of the ultraviolet absorber include salicylate derivatives such as phenyl salicylate, 4-t-butylphenyl salicylate, 2,4-di-t-butyl-phenyl 3',5'-di-t-butyl-4'-hydroxybenzoate, 4-t-octylphenyl salicylate, bis(4-t-butylbenzoyl)resorcinol, benzoylresorcinol, hexadecyl 3',5'-di-t-butyl-4'-hydroxybenzoate, octadecyl-3',5'-di-t-butyl-4'-hydroxybenzoate, 2-methyl-4,6-di-t-butyl-phenyl 3',5'-di-t-butyl-4'-hydroxybenzoate and mixtures thereof, and the like, 2-hydroxybenzophenone derivatives such as 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone and mixtures thereof, and the like, 2-(2'-hydroxyphenyl)benzotriazoles such as 2-(2-hydroxy-5-methylphenyl)benzotriazole, 2-(3',5'-di-t-butyl-2'-hydroxyphenyl)benzotriazole, 2-(5'-t-butyl-2'-hydroxyphenyl) benzotriazole, 2-(2'-hydroxy-5'-t-octylphenyl) benzotriazole, 2-(3-t-butyl-2-hydroxy-5-methylphenyl)-5-chlorobenzotriazole, 2-(3'-s-butyl-2'-hydroxy-5'-t-butylphenyl)benzotriazole, 2-(2'-hydroxy-4'-octyloxyphenyl)benzotriazole, 2-(3',5'-di-t-amyl-2'-hydroxyphenyl)benzotriaole, 2-[2'-hydroxy-3',5'-bis(α,α-dimethylbenzyl)phenyl]-2H-benzotriazole, 2-[(3'-t-butyl-2'-hydroxyphenyl)-5'-(2-octyloxycarbonylethyl)phenyl]-5-chlorobenzotriazole, 2-[3'-t-butyl-5'-[2-(2-ethylhexyloxy)carbonylethyl]-2'-hydroxyphenyl]-5-chlorobenzotriazole, 2-[3'-t-butyl-2'-hydroxy-5'-(2-methoxycarbonylethyl)phenyl]-5-chlorobenzotriazole, 2-[3'-t-butyl-2'-hydroxy-5'-(2-methoxycarbonylethyl) phenyl]benzotriazole, 2-[3'-t-butyl-2'-hydroxy-5-(2-octyloxycarbonylethyl)phenyl]benzotriazole, 2-[3'-t-butyl-2'-hydroxy-5'-[2-(2-ethylhexyloxy)carbonylethyl]phenyl] benzotriazole, 2-[2-hydroxy-3-(3,4,5,6-tetrahydrophthalimidemethyl)-5-methylphenyl] benzotriazole, 2-(3,5-di-t-butyl-2-hydroxy phenyl)-5-chlorobenzotriazole; mixture of 2-(3'-dodecyl-2'-hydroxy-5'-methylphenyl)benzotriazole and 2-[3'-t-butyl-2'-hydroxy-5'-(2-isooctyloxycarbonylethyl)phenyl] benzotriazole; 2,2'-methylenebis[6-(2H-benzotriazole-2-yl)-4-(1,1,3,3-tetramethylbutyl-)phenol, 2,2'-methylenebis[4-t-butyl-6-(2H-benzotriazole-2-yl) phenol]; condensate of poly(3 to 11) (ethylene glycol) with 2-[3'-t-butyl-2'-hydroxy-5'-(2-methoxycarbonylethyl) phenyl]benzotriazole; condensate of poly(3 to 11) (ethylene glycol) with methyl 3-[3-(2H-benzotriazole2-yl)-5-t-butyl-4-hydroxyphenyl]propionate; 2-ethylhexyl 3-[3-t-butyl-5-(5-chloro-2H-benzotriazole2-yl)-4-hydroxyphenyl]propionate, octyl 3-[3-t-butyl-5-(5-chloro-2H-benzotriazole2-yl)-4-hydroxyphenyl] propionate, methyl 3-[3-t-butyl-5-(5-chloro-2H-benzotriazole-2-yl)-4-hydroxyphenyl]propionate, 3-[3-t-butyl-5-(5-chloro-2H-benzotriazole-2-yl)-4-hydroxyphenyl]propionic acid and mixtures thereof, and the like.

Examples of the photostabilizer include hindered amine type photostabilizers such as bis(2,2,6,6-tetramethyl-4-piperidyl) sebacate, bis((2,2,6,6-tetramethyl-4-piperidyl)succinate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyloxy-2,2,6,6-tetramethyl-4-piperidyl)sebacate, bis (1,2,2,6,6-pentamethyl-4-piperidyl) 2-(3,5-di-t-butyl-4-hydroxybenzyl)-2-butyl malonate, bis(1-acroyl-2,2,6,6-tetramethyl-4-piperidyl) 2,2-bis(3,5-di-t-butyl-4-hydroxybenzyl)-2-butyl malonate, bis(1,2,2,6,6-pentamethyl-4-piperidyldecane dioate, 2,2,6,6-tetramethyl-4-piperidyl methacrylate, 4-[3-(3,5-di-t-butyl-4-hydroxyphenyl)propionyloxy]-1-[2-(3-(3,5-di-t-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl) propionamide, tetrakis(2,2,6,6-tetramethyl-4-piperidyl) 1,2,3,4-butane tetracarboxylate, tetrakis(1,2,2,6,6-pentamethyl-4-piperidyl) 1,2,3,4-butane tetracarboxylate, mixed esterified product of 1,2,3,4-butanetetracarboxylic acid with 1,2,2,6,6-pentamethyl-4-piperidinol and 1-tridecanol, mixed esterified product of 1,2,3,4-butanetetracarboxylic acid with 1,2,2,6,6-pentamethyl-4-piperidinol and 1-tridecanol, mixed esterified product of 1,2,3,4-butanetetracarboxylic acid with 2,2,6,6-tetramethyl-4-piperidinol and 1-tridecanol; mixed esterified product of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro[5.5]undecane; mixed esterified product of 1,2,3,4-butanetetracarboxylic acid with 2,2,6,6-tetramethyl-4-piperidinol and 3,9-bis(2-hydroxy-1,1-dimethylethyl)-2,4,8,10-tetraoxaspiro[5.5]undecane; polycondensate of dimethyl succinate with 1-(2-hydroxy-ethyl)-4-hydroxy-2,2,6,6-tetramethylpiperidine, poly[(6-morpholino-1,3,5-triazine-2,4-diyl)((2,2,6,6-tetramethyl-4-piperidyl)imino)hexamethylene((2,2,6,6-tetramethyl-4-piperidyl)imino)], poly[(6-(1,1,3,3-tetramethylbutyl) imino-1,3,5-triazine-2,4-diyl((2,2,6,6-tetramethyl-4-piperidyl)imino)hexamethylene((2,2,6,6-tetramethyl-4-piperidyl)imino)); polycondensate of N,N'-bis(2,2,6,6-tetramethyl-4-piperidyl)hexamethylenediamine with 1,2-dibromoethane; N,N',4,7-tetrakis[4,6-bis(N-butyl-N-(2,2,6,6-tetramethyl-4-piperidyl)amino)-1,3,5-triazine-2-yl]-4,7-diazadecane-1,10-diamine, N,N',4-tris[4,6-bis(N-butyl-N-(2,2,6,6-tetramethyl-4-piperidyl)amino)-1,3,5-triazine-2-yl]-4,7-diazadecane-1,10-diamine, N,N',4,7-tetrakis[4,6-bis(N-butyl-N-(1,2,2,6,6-pentamethyl-4-piperidyl)amino)-1,3,5-triazine-2-yl]-4,7-diazadecane-1,10-diamine, N,N',4-tris[4,6-bis(N-butyl-N-(1,2,2,6,6-pentamethyl-4-piperidyl)amino)-1,3,5-triazine-2-yl]-4,7-diazadecane-1,10-diamine and mixtures thereof, and the like, acrylate type photostabilizers such as ethyl α-cyano-β,β-diphenyl acrylate, isooctyl α-cyano-β,β-diphenyl acrylate, methyl α-carbomethoxy cinnamate, methyl α-cyano-β-methyl-p-methoxy cinnamate, butyl α-cyano-β-methyl-ρ-methoxy cinnamate, methyl α-carbomethoxy-ρ-methoxy cinnamate and N-(β-carbomethoxy-β-cyanovinyl)-2-methylindoline and mixtures thereof, and the like, nickel-based photostabilizers such as nickel complex of 2,2'-thiobis-[4-(1,1,3,3-tetramethylbutyl)phenol], nickeldibutyl dithiocarbamate, nickel salt of monoalkyl ester, nickel salt of ketoxime, and mixtures thereof, and the like, oxamide type photostabilizers such as 4,4'-dioctyloxyoxanilide, 2,2'-diethoxyoxanilide, 2,2'-dioctyloxy-5,5'-di-t-butylanilide, 2,2'-didodecyloxy-5,5'-di-t-butylanilide, 2-ethoxy-2'-ethyloxanilide, N,N'-bis(3-dimethylaminopropyl)oxamide, 2-ethoxy-5-t-butyl-2'-ethoxyanilide, 2-ethoxy-5,4'-di-t-butyl-2'-ethyloxanilide and mixtures thereof, and the like, 2-(2-hydroxyphenyl)-1,3,5-triazine type photostabilizers such as 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-[2,4-dihydroxyphenyl-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyl-oxypropoxy)phenyl]-4,6-bis(2,4-dimethylphenyl)-1,3,5-triazine, 2-[2-hydroxy-4-(2-hydroxy-3-octyloxypropoxy)phenyl]-4,6-bis(2,4-dimethylphenyl)-1,3,5-triazine and mixtures thereof, and the like.

Examples of the stabilizer include, also, hydroxyl amines such as N,N-dibenzylhydroxyamine, N,N-diethylhydroxyamine, N,N-dioctylhydroxyamine, N,N-dilaurylhydroxyamine, N,N-ditetradecylhydroxyamine, N,N-dihexadecylhydroxyamine, N,N-dioctadecylhydroxyamine, N-hexadecyl-N-octadecylhydroxyamine, N-heptadecyl-N-octadecylhydroxyamine and mixtures thereof, and the like, in addition to the above-described materials.

Examples of the metal deactivator include metal deactivators such as a thiocarbamate, a salicylic acid, a benzotriazole, an imidazole, and a thiadiazole.

Examples of the nucleating agent include nucleating agents such as a phosphoric acid metal salt, a benzylidenesorbitol, and a carboxylic acid metal salt.

Examples of the lubricant include an aliphatic hydrocarbon such as a paraffin or wax, a higher aliphatic acid having 8 to 22 carbon atoms, a metal (Al, Ca, Mg, Zn) salt of a higher aliphatic acid having 8 to 22 carbon atoms, an aliphatic alcohol having 8 to 22 carbon atoms, a polyglycol, an ester formed from a higher fatty acid having 4 to 22 carbon atoms and an aliphatic monohydric alcohol having 4 to 18 carbon atoms, a higher aliphatic amide having 8 to 22 carbon atoms, a silicone oil, and a rosin derivative.

Examples of the antistatic agent include a nonionic antistatic agent such as an ester or an ether; an anionic antistatic agent such as a sulfonic acid salt or a phosphoric acid salt; a cationic antistatic agent; and an amphoteric antistatic agent.

Examples of the flame retardant include an inorganic flame retardant such as magnesium hydroxide or aluminum hydroxide; and an organic flame retardant such as a halogen-based flame retardant or a phosphorus-based flame retardant.

Examples of the filler include carbon black, white carbon, clay, mica, calcium carbonate, and talc.

Examples of the pigment include an organic pigment such as an isoindolinone-based pigment, an azo-based pigment, a phthalocyanine-based pigment, a threnene-based pigment, or a quinacridone-based pigment; and an inorganic pigment such as carbon black, colcothar, chrome lead, molybdate orange, normal lead chromate, lead molybdate, titanium white, ultramarine, navy blue/cobalt blue, titanium yellow, graphite, and zinc white.

Among the above additives, preferably used are phenol type antioxidants, phosphorus-based antioxidants, sulfur-based antioxidants, ultraviolet absorbers and hindered amine type photostabilizers.

More preferable phenol type antioxidants include 2-[1-(2-hydroxy-3,5-di-t-pentylphenyl)ethyl]-4,6-di-t-pentylphenylacrylate, 2-t-butyl-6-(3-t-butyl-2-hydroxy-5-methylbenzyl)-4-methylphenylacrylate, 2,6-di-t-butyl-4-methylphenol, 2,4,6-tri-t-butylphenol, 2,4-dioctylthiomethyl-6-methylphenol, 2,2'-thiobis(6-t-butylphenol), 4,4'-thiobis(3-methyl-6-t-butylphenol), 2,2'-methylenebis(4-methyl-6-t-butylphenol), 2,2'-methylenebis(4-ethyl-6-t-butylphenol), 2,2'-methylenebis[4-methyl-6-(α-methylcyclohexyl)phenol], 2,2'-methylenebis(4-methyl-6-cyclohexylphenol), 2,2'-methylenebis(4,6-di-t-butylphenol), 2,2'-ethylidenebis(4,6-di-t-butylphenol), 4,4'-methylenebis(6-t-butyl-2-methylphenol), 4,4'-methylenebis(2,6-di-t-butylphenol), 4,4'-butylidenebis(3-methyl-6-t-butylphenol), 1,1-bis(4-hydroxyphenyl)cyclohexane, 1,1-bis(5-t-butyl-4-hydroxy-2-methylphenyl)butane, 1,1,3-tris(5-t-butyl-4-hydroxy-2-methylphenyl)butane, ethylene glycol bis[3,3-bis-3'-t-butyl-4'-hydroxyphenyl]butyrate, 2,4,6-tris(3,5-di-t-butyl-4-phenoxy)-1,3,5-triazine, tris(4-t-butyl-3-hydroxy-2,6-dimethylbenzyl)isocyanurate, bis(3,5-di-t-butyl-4-hydroxybenzyl)isocyanurate, tris[2-(3',5'-di-t-butyl-4'-hydroxy-cinnamoyloxy)ethyl]isocyanurate, diethyl-3,5-di-t-butyl-4-hydroxybenzyl phosphonate, di-n-octadecyl-3,5-di-t-butyl-4-hydroxybenzyl phosphonate, calcium salt of 3,5-di-t-butyl-4-hydroxybenzylphosphonic acid monoester, n-octadecyl-3-(3,5-di-t-butyl-4-hydroxyphenyl)propionate, neopentanetetrayltetrakis(3,5-di-t-butyl-4-hydroxycinnamate), thiodiethylene-bis(3,5-di-t-butyl-4-hydroxycinnamate), 1,3,5-trimethyl-2,4,6-tris(3,5-di-t-butyl-4-hydroxybenzyl)benzene, 3,6-dioxaoctamethylenebis(3,5-di-t-butyl-4-hydroxycinnamate), hexamethylenebis(3,5-di-t-butyl-4-hydroxycinnamate), triethylene glycol bis(5-t-butyl-4-hydroxy-3-methyl cinnamate), 3,9-bis[2-(3-(3-t-butyl-4-hydroxy-5-methylphenyl)propionyloxy)-1,1-dimethylethyl]-2,4,8,10-tetraoxaspiro[5.5]undecane, N,N'-bis[3-(3',5'-di-t-butyl-4'-hydroxyphenyl)propionyl] hydrazine, N,N'-bis[3-(3',5'-di-t-butyl-4'-hydroxyphenyl)propionyl]hexamethylenediamine and the like, and one or more of the above antioxidants can be used.

More preferable phosphorus-based antioxidants include tris(nonylphenyl)phosphite, tris(2,4-di-t-butylphenyl)phosphite, 6-[3-(3-t-buthyl-4-hydroxy-5-methylphenyl)propoxy]-2,4,6,8,10-tetra-t-buthylbenzo[d.f][1.3.2]dioxaphosphepine, distearyl pentaerythritol diphosphite, bis(2,4-di-t-butylphenyl)pentaerythritol diphosphite, bis(2,4-di-t-butyl-6-methylphenyl)pentaerythritol diphosphite, bis(2,6-di-t-butyl-4-methylphenyl)pentaerythritol diphosphite, tetrakis(2,4-di-t-butyl-phenyl)-4,4'-diphenylene diphosphonite, 2,2'-methylenebis(4,6-di-t-butyl-phenyl) 2-ethylhexyl phosphite, 2,2'-ethylidenebis(4,6-di-t-butyl-phenyl)fluorophosphite, bis(2,4-di-t-butyl-6-methylphenyl)ethyl phosphite, 2-(2,4,6-tri-t-butyl-phenyl)-5-ethyl-5-butyl-1,3,2-oxaphosphorinane, 2,2',2"-nitrilo[triethyltris(3,3',5,5'-tetrat-butyl-1,1'-biphenyl-2,2'-diyl) phosphite and the like, and one or more of the above antioxidants can be used.

Examples of more preferable ultraviolet absorbers include phenyl salicylate, 4-t-butylphenyl salicylate, 2,4-di-t-butylphenyl 3',5'-di-t-butyl-4'-hydroxybenzoate, 4-t-octylphenyl salicylate, 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone, 2-(2-hydroxy-5-methylphenyl)benzotriazole, 2-(3',5'-di-t-butyl-2'-hydroxyphenyl)benzotriazole, 2-(5'-t-butyl-2'-hydroxyphenyl)benzotriazole, 2-(2'-hydroxy-5'-t-octylphenyl)benzotriazole, 2-(3-t-butyl-2-hydroxy-5-methylphenyl)-5-chlorobenzotriazole, 2-(3'-s-butyl-2'-hydroxy-5'-t-butyl-phenyl)benzotriazole, 2-(2'-hydroxy-4'-octyloxyphenyl)benzotriazole, 2-(3',5'-di-t-amyl-2'-hydroxyphenyl)benzotriazole, 2-[2'-hydroxy-3',5'-bis(α, α-dimethylbenzyl)phenyl]-2H-benzotriazole and the like, and one or more of the above ultraviolet absorbers can be used.

Examples of more preferable hindered Amine photostabilizers include bis(2,2,6,6-tetramethyl-4-piperidyl)sebacate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyloxy-2,2,6,6-tetramethyl-4-piperidyl)sebacate, bis(1,2,2,6,6-pentamethyl-4-piperidyl)2-(3,5-di-t-butyl-4-hydroxybenzyl)-2-butyl malonate, bis(1-acroyl-2,2,6,6-tetramethyl-4-piperidyl) 2,2-bis(3,5-di-t-butyl-4-hydroxybenzyl)-2-butyl malonate, bis(2,2,6,6-tetramethyl- 4-piperidyl)succinate, 2,2,6,6-tetramethyl-4-piperidyl methacrylate, 4-[3-(3,5-di-t-butyl-4-hydroxyphenyl)propionyloxy]-1-[2-(3-(3,5-di-t-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl)propionamide, tetrakis(2,2,6,6-tetramethyl-4-piperidyl) 1,2,3,4-butane tetracarboxylate, tetrakis(1,2,6,6-pentamethyl-4-piperidyl) 1,2,3,4-butane tetracarboxylate; mixed esterified produced of 1,2,3,4-butanetetracarboxylic acid with 1,2,2,6,6-pentamethyl-4-piperidinol and 1-tridecanol; mixed esterified produced of 1,2,3,4-butanetetracarboxylic acid with 2,2,6,6-tetramethyl-4-piperidinol and 1-tridecanol; mixed esterified produced of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro[5.5]undecane; mixed esterified produced of 1,2,3,4-butanetetracarboxylic acid with 2,2,6,6-tetramethyl-4-piperidinol and 3,9-bis(2-hydroxy-1,1-dimethylethyl)-2,4,8,10-tetraoxaspiro[5.5]undecane; polycondensate of dimethyl succinate with 1-(2-hydroxy-ethyl)-4-hydroxy-2,2,6,6-tetramethylpiperidine; poly[(6-morpholino-1,3,5-triazine-2,4-diyl)((2,2,6,6-tetramethyl-4-piperidyl)imino)hexamethylene((2,2,6,6-tetramethyl-4-piperidyl)imino)], and poly[(6-(1,1,3,3-tetramethylbutyl-)-1,3,5-triazine-2,4-diyl)((2,2,6,6-tetramethyl-4-piperidyl)imino)hexamethylene((2,2,6,6-tetramethyl-4-piperidyl)imino)] and the like, and these can be used singly or in combination of two or more.

When an antioxidant is added to the thermoplastic polymer material, the total amount of the antioxidant is, per 100 parts by weight of the thermoplastic polymer, preferably from 0.01 parts by weight to 5 parts by weight.

A thermoplastic polymer material obtained by the method of the present invention is molded into a molded body having various shapes such as a film, a sheet, a pipe, or a container by a known molding method such as extrusion molding, injection molding, compression molding, hollow molding, foam molding, or crosslinking molding, and is used in various products.

In accordance with the present invention, there can be provided a method for producing a thermoplastic polymer material having a small amount of volatile component by removing volatile components such as solvent and monomer from a thermoplastic polymer containing solvent and/or monomer by means of a vent type extruder, wherein the mechanical properties of the thermoplastic polymer material are maintained even when the rotational speed of a screw of the extruder is increased or the polymer temperature within the extruder is increased.

EXAMPLES

The present invention is explained below by reference to Examples and Comparative examples.

Physical properties were evaluated by the following methods.

1. Mooney viscosity ($ML_{1+4}$)

The Mooney viscosity of a polymer was measured at 100° C. in accordance with JIS K6300 (1994).

2. Vinyl bond content (units: % by mol)

The vinyl bond content of a polymer was determined by IR spectroscopy from the absorption intensity at around 910 $cm^{-1}$, which is an absorption peak of a vinyl group.

3. Styrene unit content (units: % by weight)

The styrene unit content of a polymer was determined from refractive index in accordance with JIS K6383 (1995).

4. Breaking strength and elongation at break

A No. 3 shape dumbbell test piece was cut out from a crosslinked sheet in accordance with JIS K6251, the test piece was stretched using a tensile tester at a predetermined speed (500 mm/min), and the strength and elongation when the test piece broke were measured.

5. Volatile component content

The weight of a thermoplastic polymer material was measured before and after heat treatment at 170° C. for 5 minutes using an MX-50 heat drying type moisture analyzer manufactured by A&D Company, Limited, and the difference between the weight of the thermoplastic polymer material before the heat treatment and the weight of the thermoplastic polymer material after the heat treatment was determined, with the weight of the thermoplastic polymer material before the heat treatment as 100% by weight.

Example 1

A twin screw extruder having four vents, that is, a first vent, a second vent, a third vent, and a fourth vent in order from the upstream side of the extruder toward the downstream side, a starting material supply opening between the first vent and the second vent, a first liquid inlet between the second vent and the third vent, and a second liquid inlet between the third vent and the fourth vent was used.

The cylinder temperature was set at 120° C., a degassing operation was carried out by the 4 vents, a composition made up of industrial hexane and an oil-extended styrene-butadiene copolymer (hereinafter, referred to as oil-extended thermoplastic polymer A) [containing, per 100 parts by weight of the styrene-butadiene copolymer, 18 parts by weight of an extender oil and 0.9 parts by weight of a phenol-based antioxidant and a sulfur-based antioxidant, Mooney viscosity ($ML_{1+4}$ (100° C.)) 68, styrene-butadiene copolymer: styrene content 28% by weight, vinyl content 36 mol %] (the content of industrial hexane being 18 parts by weight per 100 parts by weight of oil-extended thermoplastic polymer A) was supplied to the twin screw extruder via the starting material supply opening, 1.25 parts by weight (per 100 parts by weight of oil-extended thermoplastic polymer A) of a 20% by weight aqueous solution of trehalose was supplied to the twin screw extruder via the first liquid inlet, 1 part by weight (per 100 parts by weight of oil-extended thermoplastic polymer A) of water was supplied to the twin screw extruder via the second liquid inlet, and a thermoplastic polymer material containing oil-extended thermoplastic polymer A and trehalose (hereinafter, referred to as thermoplastic polymer material A) was extruded through a die. The ratio of the amount of composition supplied (kg/Hr) to the screw rotational speed (rpm) (amount of composition supplied/screw rotational speed) in the starting material supply opening was 1.41 (kg/Hr/rpm).

Extrusion conditions and the volatile component content of the thermoplastic polymer material A obtained are shown in Table 1.

118 parts by weight of the thermoplastic polymer material A obtained, 78.4 parts by weight of silica (product name: Ultrasil VN3-G, Degussa), 6.4 parts by weight of a silane coupling agent (product name: Si69, Degussa), 6.4 parts by weight of carbon black (product name: Diablack N339, Mitsubishi Chemical Corporation), 29.6 parts by weight of an extender oil (product name: NC-140, Nippon Oil Corporation), 1.5 parts by weight of an antioxidant (product name: Antigene 3C, Sumitomo Chemical Co., Ltd.), 2 parts by weight of stearic acid, 2 parts by weight of zinc white, 1 part by weight of a vulcanizing accelerator (product name: Soxinol CZ, Sumitomo Chemical Co., Ltd.), 1 part by weight of a vulcanizing accelerator (product name: Soxinol D, Sumitomo Chemical Co., Ltd.), 1.5 parts by weight of a wax (product name: Sunnoc N, Ouchi Shinko Chemical Industrial Co., Ltd.), and 1.4 parts by weight of sulfur were kneaded by means of a Labo Plastomill to prepare a polymer composition. The polymer composition obtained was molded into a sheet by means of a 6 inch roll, and the sheet was vulcanized by heating at 160° C. for 45 minutes to prepare a 2 mm thick vulcanized sheet. The results of evaluation of the physical properties of the vulcanized sheet are shown in Table 1.

Example 2

The procedure of Example 1 was repeated except that the amount of the composition made up of thermoplastic polymer A and industrial hexane supplied was 1.11 times that of Example 1 and the screw rotational speed was 1.20 times that of Example 1. Extrusion conditions, the volatile component content of the thermoplastic polymer material obtained, and the results of evaluation of the physical properties of the vulcanized sheet are shown in Table 1.

Reference Example 1

The procedure of Example 1 was repeated except that 1 part by weight (per 100 parts by weight of oil-extended thermoplastic polymer A) of water was supplied via liquid inlet 1. Extrusion conditions, the volatile component content of the thermoplastic polymer material obtained, and the results of evaluation of the physical properties of the vulcanized sheet are shown in Table 1.

Reference Example 2

The procedure of Example 2 was repeated except that 1 part by weight (per 100 parts by weight of oil-extended thermoplastic polymer A) of water was supplied via liquid inlet 1. Extrusion conditions, the volatile component content of the thermoplastic polymer material obtained, and the results of evaluation of the physical properties of the vulcanized sheet are shown in Table 1.

TABLE 1

|  | Ex. 1 | Ex. 2 | Ex. 3 | Ref. Ex. 1 | Ref. Ex. 2 |
|---|---|---|---|---|---|
| Extrusion conditions |  |  |  |  |  |
| Cylinder temperature (° C.) | 120 | 120 | 120 | 120 | 120 |
| Screw rotational speed ratio*1 | 1 | 1.20 | 1.48 | 1 | 1.20 |
| Starting material supply opening |  |  |  |  |  |
| Proportion of composition supplied*2 | 1 | 1.11 | 1.23 | 1 | 1.11 |
| Liquid inlet 1 |  |  |  |  |  |
| Polymer temperature (° C.) | 155 | 165 | 175 | 155 | 165 |
| Hexane content (parts by weight)*3 | 2.8 | 3.0 | 3.2 | 2.8 | 3.0 |
| Material supplied | T liquid*5 | T liquid*5 | T liquid*5 | Water | Water |
| Amount supplied (parts by weight)*4 | 1.25 | 1.25 | 1.25 | 1 | 1 |
| Liquid inlet 2 |  |  |  |  |  |
| Polymer temperature (° C.) | 175 | 185 | 195 | 175 | 185 |
| Hexane content (parts by weight)*3 | 0.9 | 1.1 | 1.3 | 0.9 | 1.1 |
| Material supplied | Water | Water | Water | Water | Water |
| Amount supplied (parts by weight)*4 | 1 | 1 | 1 | 1 | 1 |
| Extruder outlet |  |  |  |  |  |
| Polymer temperature (° C.) | 200 | 210 | 220 | 200 | 210 |
| Physical properties |  |  |  |  |  |
| Volatile component content (wt %) | 0.45 | 0.50 | 0.55 | 0.45 | 0.50 |
| Tensile properties |  |  |  |  |  |
| Breaking strength (MPa) | 21 | 21 | 21 | 21 | 19 |
| Elongation at break (%) | 620 | 620 | 620 | 620 | 590 |

*1 Value when rotational speed of Example 1 per unit time was defined as 1
*2 Value when amount of composition supplied (weight) of Example 1 was defined as 1
*3 Parts by weight per 100 parts by weight of oil-extended thermoplastic polymer A
*4 Parts by weight per 100 parts by weight of oil-extended thermoplastic polymer A
*5 Aqueous solution of 20% by weight of trehalose Example 3

The procedure of Example 1 was repeated except that the amount of the composition made up of thermoplastic polymer A and industrial hexane supplied was 1.23 times that of Example 1 and the screw rotational speed was 1.48 times that of Example 1. Extrusion conditions, the volatile component content of the thermoplastic polymer material obtained, and Example 4

A twin screw extruder having four vents, that is, a first vent, a second vent, a third vent, and a fourth vent in order from the upstream side of the extruder toward the downstream side, a starting material supply opening between the first vent and the second vent, a first liquid inlet between the second vent and the third vent, and a second liquid inlet between the third vent and the fourth vent was used:

The cylinder temperature was set at 150° C., a degassing operation was carried out by the 4 vents, a composition made up of industrial hexane and an oil-extended styrene-butadiene copolymer (hereinafter, referred to as oil-extended thermoplastic polymer B) [containing, per 100 parts by weight of the styrene-butadiene copolymer, 37.5 parts by weight of an extender oil and 0.5 parts by weight of a phenol-based antioxidant and a sulfur-based antioxidant, Mooney viscosity ($ML_{1+4}$ (100° C.)) 52, styrene-butadiene copolymer: styrene content 31% by weight, vinyl content 52 mol %] (the content of industrial hexane being 18 parts by weight per 100 parts by weight of oil-extended thermoplastic polymer B) was supplied to the twin screw extruder via the starting material supply opening, 0.6 parts by weight (per 100 parts by weight of oil-extended thermoplastic polymer B) of a 9% by weight aqueous solution of mannitol was supplied to the twin screw extruder via the first liquid inlet, 0.5 part by weight (per 100 parts by weight of oil-extended thermoplastic polymer B) of water was supplied to the twin screw extruder via the second liquid inlet, and a thermoplastic polymer material containing oil-extended thermoplastic polymer B and mannitol (hereinafter, referred to as thermoplastic polymer material B) was extruded through a die. The ratio of the amount of composition supplied (kg/Hr) to the screw rotational speed (rpm) (amount of composition supplied/screw rotational speed) in the starting material supply opening was 0.92 (kg/Hr/rpm).

Extrusion conditions and the volatile component content of the thermoplastic polymer material B obtained are shown in Table 1.

137.5 parts by weight of the thermoplastic polymer material B obtained, 78.4 parts by weight of silica (product name: Ultrasil VN3-G, Degussa), 6.4 parts by weight of a silane coupling agent (product name: Si69, Degussa), 6.4 parts by weight of carbon black (product name: Diablack N339, Mitsubishi Chemical Corporation), 10.1 parts by weight of an extender oil (product name: NC-140, Nippon Oil Corporation), 1.5 parts by weight of an antioxidant (product name: Antigene 3C, Sumitomo Chemical Co., Ltd.), 2 parts by weight of stearic acid, 2 parts by weight of zinc white, 1 part by weight of a vulcanizing accelerator (product name: Soxinol D, Sumitomo Chemical Co., Ltd.), 1 part by weight of a vulcanizing accelerator (product name: Soxinol D, Sumitomo Chemical Co., Ltd.), 1.5 parts by weight of a wax (product name: Sunnoc N, Ouchi Shinko Chemical Industrial Co., Ltd.), and 1.4 parts by weight of sulfur were kneaded by means of a Labo Plastomill to prepare a polymer composition. The polymer composition obtained was molded into a sheet by means of a 6 inch roll, and the sheet was vulcanized by heating at 160° C. for 45 minutes to prepare a 2 mm thick vulcanized sheet. The results of evaluation of the physical properties of the vulcanized sheet are shown in Table 2.

Reference Example 3

The procedure of Example 4 was repeated except that 0.5 part by weight (per 100 parts by weight of oil-extended thermoplastic polymer B) of water was supplied via liquid inlet 1. Extrusion conditions, the volatile component content of the thermoplastic polymer material obtained, and the results of evaluation of the physical properties of the vulcanized sheet are shown in Table 2.

Reference Example 4

The procedure of Example 4 was repeated except that 0.5 part by weight (per 100 parts by weight of oil-extended thermoplastic polymer B) of water was supplied via liquid inlet 1, and the screw rotational speed was 0.78 times that of Example 4. Extrusion conditions, the volatile component content of the thermoplastic polymer material obtained, and the results of evaluation of the physical properties of the vulcanized sheet are shown in Table 2.

TABLE 2

|  | Ex. 4 | Ref. Ex. 3 | Ref. Ex. 4 |
|---|---|---|---|
| Extrusion conditions |  |  |  |
| Cylinder temperature (° C.) | 150 | 150 | 150 |
| Screw rotational speed ratio*[1] | 1 | 1 | 0.78 |
| Starting material supply opening |  |  |  |
| Proportion of composition supplied*[2] | 1 | 1 | 1 |
| Liquid inlet 1 |  |  |  |
| Polymer temperature (° C.) | 175 | 175 | 165 |
| Hexane content (parts by weight)*[3] | 2.9 | 2.9 | 3.2 |
| Material supplied | M liquid*[5] | Water | Water |
| Amount supplied (parts by weight)*[4] | 0.5 | 0.5 | 0.5 |
| Liquid inlet 2 |  |  |  |
| Polymer temperature (° C.) | 195 | 195 | 185 |
| Hexane content (parts by weight)*[3] | 0.8 | 0.8 | 1.2 |
| Material supplied | Water | Water | Water |
| Amount supplied (parts by weight)*[4] | 0.5 | 0.5 | 0.5 |
| Extruder outlet |  |  |  |
| Polymer temperature (° C.) | 225 | 225 | 210 |
| Physical properties |  |  |  |
| Volatile component content (wt %) | 0.25 | 0.30 | 0.40 |
| Tensile properties |  |  |  |
| Breaking strength (MPa) | 21 | 19 | 21 |
| Elongation at break (%) | 540 | 500 | 540 |

*[1]Value when rotational speed of Example 4 per unit time was defined as 1
*[2]Value when amount of composition supplied (weight) of Example 4 was defined as 1
*[3]Parts by weight per 100 parts by weight of oil-extended thermoplastic polymer B
*[4]Parts by weight per 100 parts by weight of oil-extended thermoplastic polymer B
*[5]Aqueous solution of 9% by weight of mannitol Example 5

A twin screw extruder having four vents, that is, a first vent, a second vent, a third vent, and a fourth vent in order from the upstream side of the extruder toward the downstream side, a starting material supply opening between the first vent and the second vent, a first liquid inlet between the second vent and the third vent, and a second liquid inlet between the third vent and the fourth vent is used.

The cylinder temperature is set at 150° C., a degassing operation is carried out by the 4 vents, a composition made up of industrial hexane and an oil-extended thermoplastic polymer B (the content of industrial hexane being 18 parts by weight per 100 parts by weight of oil-extended thermoplastic polymer B) is supplied to the twin screw extruder via the starting material supply opening, 0.6 parts by weight (per 100 parts by weight of oil-extended thermoplastic polymer B) of a 9% by weight aqueous solution of sorbitol is supplied to the twin screw extruder via the first liquid inlet, 0.5 part by weight (per 100 parts by weight of oil-extended thermoplastic polymer B) of water is supplied to the twin screw extruder via the second liquid inlet, and a thermoplastic polymer material containing oil-extended thermoplastic polymer B and sorbitol (hereinafter, referred to as thermoplastic polymer material C) is extruded through a die. The ratio of the amount of composition supplied (kg/Hr) to the screw rotational speed (rpm) (amount of composition supplied/screw rotational speed) in the starting material supply opening is 0.92 (kg/Hr/rpm).

137.5 parts by weight of the thermoplastic polymer material C obtained, 78.4 parts by weight of silica (product name: Ultrasil VN3-G, Degussa), 6.4 parts by weight of a silane coupling agent (product name: Si69, Degussa), 6.4 parts by weight of carbon black (product name: Diablack N339, Mitsubishi Chemical Corporation), 10.1 parts by weight of an extender oil (product name: NC-140, Nippon Oil Corporation), 1.5 parts by weight of an antioxidant (product name: Antigene 3C, Sumitomo Chemical Co., Ltd.), 2 parts by weight of stearic acid, 2 parts by weight of zinc white, 1 part by weight of a vulcanizing accelerator (product name: Soxinol D, Sumitomo Chemical Co., Ltd.), 1 part by weight of a vulcanizing accelerator (product name: Soxinol D, Sumitomo Chemical Co., Ltd.), 1.5 parts by weight of a wax (product name: Sunnoc N, Ouchi Shinko Chemical Industrial Co., Ltd.), and 1.4 parts by weight of sulfur are kneaded by means of a Labo Plastomill to prepare a polymer composition. The polymer composition obtained is molded into a sheet by means of a 6 inch roll, and the sheet is vulcanized by heating at 160° C. for 45 minutes to prepare a 2 mm thick vulcanized sheet.

Example 6

The procedure of Example 5 is repeated except that an aqueous solution of 9% by weight of sucrose is used instead of the aqueous solution of 9% by weight of sorbitol.

Example 7

The procedure of Example 5 is repeated except that an aqueous solution of 9% by weight of lactose is used instead of the aqueous solution of 9% by weight of sorbitol.

Example 8

The procedure of Example 5 is repeated except that an aqueous solution of 9% by weight of maltose is used instead of the aqueous solution of 9% by weight of sorbitol.

Example 9

The procedure of Example 5 is repeated except that an aqueous solution of 9% by weight of melicitose is used instead of the aqueous solution of 9% by weight of sorbitol.

Example 10

The procedure of Example 5 is repeated except that an aqueous solution of 9% by weight of stachyose is used instead of the aqueous solution of 9% by weight of sorbitol.

Example 11

The procedure of Example 5 is repeated except that an aqueous solution of 9% by weight of curdlan is used instead of the aqueous solution of 9% by weight of sorbitol.

Example 12

The procedure of Example 5 is repeated except that an aqueous solution of 9% by weight of glycogen is used instead of the aqueous solution of 9% by weight of sorbitol.

Example 13

The procedure of Example 5 is repeated except that an aqueous solution of 9% by weight of methyl α-D-glucopyranoside is used instead of the aqueous solution of 9% by weight of sorbitol.

Example 14

The procedure of Example 5 is repeated except that an aqueous solution of 9% by weight of n-octyl β-D-glucopyranoside is used instead of the aqueous solution of 9% by weight of sorbitol.

Example 15

The procedure of Example 5 is repeated except that an aqueous solution of 9% by weight of myo-inositol is used instead of the aqueous solution of 9% by weight of sorbitol.

Example 16

The procedure of Example 5 is repeated except that an aqueous solution of 9% by weight of scyllo-inositol is used instead of the aqueous solution of 9% by weight of sorbitol.

Example 17

The procedure of Example 5 is repeated except that an aqueous solution of 9% by weight of glucose is used instead of the aqueous solution of 9% by weight of sorbitol.

Example 18

The procedure of Example 5 is repeated except that an aqueous solution of 9% by weight of fructose is used instead of the aqueous solution of 9% by weight of sorbitol.

The invention claimed is:

1. A method for producing a thermoplastic polymer material, the method comprising the steps of:
supplying component (A) below to a vent extruder comprising a starting material supply opening, a liquid inlet, and a vent via the starting material supply opening of the vent extruder;
supplying component (B) below to the vent extruder via the liquid inlet of the vent extruder;
melting and kneading component (A) and component (B) within the vent extruder; and
degassing a volatile component via the vent extruder and extruding a die a thermoplastic polymer material comprising a thermoplastic polymer contained in component (A) and at least one compound group S contained in component (B);
wherein component (A) is a polymer composition comprising a thermoplastic polymer and at least one of the group consisting of organic solvent and a monomer;
wherein component (B) is a solution of at least one compound group S below;
compound group S is selected from the group consisting of a compound represented by the formula $C_nH_{n+2}(OH)_n$, wherein n denotes an integer of not less than 4, an alkoxylated material below, a compound represented by formula (2) below, trehalose, sucrose, lactose, maltose, melezitose, stachyose, curdlan, glycogen, glucose, and fructose;
the alkoxylated material is a compound in which at least one hydroxy group of a compound represented by formula (1) below is alkoxylated with an alkyl group having 1 to 12 carbon atoms, and the compound represented by formula (1) being a compound comprising in the molecule an aldehyde or ketone group and m−1 hydroxy groups

 (1)

wherein m denotes an integer of not less than 3,

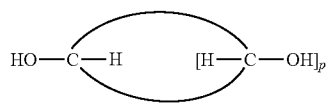 (2)

wherein p denotes an integer of not less than 2.

2. The method according to claim 1, wherein the position of the vent extruder liquid inlet for supplying component (B) is on the downstream side relative to the position of the vent extruder starting material supply opening for supplying component (A), and is in a zone in which the total content of the organic solvent and monomer in the thermoplastic polymer composition within the vent extruder is not more than 10 parts by weight, provided that the thermoplastic polymer is 100 parts by weight.

3. The method according to claim 1, wherein the position of the vent extruder liquid inlet for supplying component (B) is in a zone in which the temperature of the thermoplastic polymer is from 120° C. to 250° C., and the temperature of the thermoplastic polymer material extruded through the die is from 150° C. to 300° C.

4. The method according to claim 1, wherein component (B) having a compound group S concentration of 0.01% to 60% by weight is supplied to the vent extruder in an amount at which the amount of compound group S per 100 parts by weight of the thermoplastic copolymer is from 0.001 to 5 parts by weight.

5. The method according to claim 1, wherein component (B) is an aqueous solution.

6. The method according to claim 1, wherein the thermoplastic polymer comprises a diene polymer.

7. The method according to claim 1, wherein the thermoplastic polymer comprises a butadiene-styrene copolymer.

* * * * *